United States Patent
Yu et al.

(10) Patent No.: US 7,285,209 B2
(45) Date of Patent: *Oct. 23, 2007

(54) METHOD AND APPARATUS FOR SEPARATING EMULSIFIED WATER FROM HYDROCARBONS

(76) Inventors: Guanghua Yu, 8 Flintlock Ter., Rockaway, NJ (US) 07866; Chang-Wei Jen, 16 Jordanna Ct., Bedminster, NJ (US) 07921; Montfort Thierry, 266 Fairmount Rd., Long Valley, NJ (US) 07853

(*) Notice: Subject to any disclaimer, the term of this patent is extended or adjusted under 35 U.S.C. 154(b) by 272 days.

This patent is subject to a terminal disclaimer.

(21) Appl. No.: 10/865,482

(22) Filed: Jun. 9, 2004

(65) Prior Publication Data

US 2004/0222156 A1    Nov. 11, 2004

Related U.S. Application Data

(63) Continuation-in-part of application No. 10/034,507, filed on Dec. 28, 2001, now Pat. No. 6,764,598.

(51) Int. Cl.
| | |
|---|---|
| *B01D 36/04* | (2006.01) |
| *B01D 29/56* | (2006.01) |
| *B01D 61/14* | (2006.01) |
| *B01D 61/00* | (2006.01) |
| *B01D 36/00* | (2006.01) |

(52) U.S. Cl. ............... 210/195.2; 210/251; 210/257.2; 210/261; 210/295; 210/314; 210/321.64; 210/DIG. 5; 210/650; 210/644; 210/323.2

(58) Field of Classification Search ............ None
See application file for complete search history.

(56) References Cited

U.S. PATENT DOCUMENTS

| 4,372,847 A | 2/1983 | Lewis |
| 4,814,087 A | 3/1989 | Taylor |

(Continued)

OTHER PUBLICATIONS

Mulder, Marcel, Basic Principles of Membrane Technology, pp. 207-208, 318-321, Kluwer Academic Publishers, Dordrecht/Boston/London.

(Continued)

*Primary Examiner*—Krishnan S. Menon
(74) *Attorney, Agent, or Firm*—Williamson Intellectual Property Law, LLC; Thomas R. Williamson, III

(57) ABSTRACT

The invention discloses an apparatus for filtration of water from hydrocarbons comprised of a fresh-feed inlet, a first dead end filter, that is hydrophobic, a second sweeping-flow filter, that is hydrophobic, a common housing containing both the first and second filters, a system for the recirculation of the retentate, a chamber for water settling, and an outlet for clean fuel permeate. This invention takes advantage of the properties of the functional groups of a surfactant, by using the surfactant to allow a hydrophobic medium to attract water, attach the water molecules to the hydrophobic medium, and then allow for agglomeration of the water molecules, which finally become large enough to detach and be swept away by the sweeping-flow. This invention can thus be used to remove high concentrations of water, up to 5%, in hydrocarbons, while allowing a high flow rate by preventing blockage of the final filter by water.

20 Claims, 6 Drawing Sheets

TOP SECTIONAL VIEW

CROSS SECTIONAL VIEW

U.S. PATENT DOCUMENTS

| | | |
|---|---|---|
| 4,846,976 A | 7/1989 | Ford |
| 4,978,454 A | 12/1990 | Sweet |
| 4,988,445 A | 1/1991 | Fulk, Jr. |
| 5,149,433 A | 9/1992 | Lien |
| 5,443,724 A | 8/1995 | Williamson et al. |
| 5,507,942 A | 4/1996 | Davis |
| 5,766,449 A | 6/1998 | Davis |
| 5,916,442 A | 6/1999 | Goodrich |
| 5,993,675 A | 11/1999 | Hagerthy |
| 6,042,722 A | 3/2000 | Lenz |
| 6,146,535 A | 11/2000 | Sutherland |
| 6,203,698 B1 | 3/2001 | Goodrich |
| RE37,165 E | 5/2001 | Davis |
| 6,764,598 B2 | 7/2004 | Yu et al. |
| 2003/0121858 A1 | 7/2003 | Yu et al. |

OTHER PUBLICATIONS

Dickerson, Christopher T., Filters and Filtration Handbook (1997), pp. 145-147, 421-425, 4th Edition, Elsevier Advanced Technology.

TOP SECTIONAL VIEW

CROSS SECTIONAL VIEW

METHOD AND APPARATUS FOR SEPARATING EMULSIFIED WATER FROM HYDROCARBONS

CROSS-REFERENCES TO RELATED APPLICATIONS

This application is a continuation-in-part of Non-provisional application Ser. No. 10/034,507, filed Dec. 28, 2001 now U.S. Pat. No. 6,764,598, entitled "Method and Apparatus for Separating Emulsified Water from Fuel".

FEDERALLY SPONSORED RESEARCH

This application arose out of work under Contract #DAAE07-010-C-L023, Jan. 31, 2001, entitled "A Compact Self-cleaning Surfactant Resistant Fuel Filter", DoD SBIR A99-089, Sponsored by U.S. Army TACOM

TECHNICAL FIELD

This invention relates to filtration to remove emulsified water from various types of liquid hydrocarbons, such as oils, fuels, and other solvents, where the emulsification is accomplished through the use of surfactants.

BACKGROUND OF THE INVENTION

When water is present in an oil, fuel or other solvent, the preferred method of removal is through the use of a hydrophobic filter screen that prevents the passage of water. Such a screen can become covered with water, and the covering prevents the passage of oil or fuel through the filter. Water may then be removed by backflushing or sweeping the surface with a flow to carry away the trapped water. However, the need for backflushing imparts an additional function that suspends the action of the filter for a period of time.

Other methods have used hydrophobic prefilters, but these suffer from the same need to backflush or sweep with a flow to remove the water on the filter surface.

In order to obviate the need to backflush, hydrophilic filters are often chosen for the first filter in a system. The hydrophilic filter will allow the passage of water into its interior, where the particles are absorbed onto the filter medium surface and coalesce into larger globules of water. These then eventually break free and pass into the gap separating the first filter from the second filter. There, a stream of oil or fuel carries away the water that has passed the first filter. However, when the oil or fuel being filtered contains an emulsifying agent, the particles of water will remain suspended and pass through the first filter without coalescing, and continue on to the second filter. The emulsified water will then pass through this last filter under pressure, and continue to contaminate the oil or fuel.

In this typical construction of the prior art used to remove water from jet fuel, a conventional fuel-water separator is usually comprised of two different filter cartridges. The two cartridges are arranged in series. The first is a water-coalescing cartridge, and the second is a water-separating cartridge. This latter cartridge is hydrophobic and operates to exclude water as described. Fuel contaminated with water passes through the coalescing filter cartridge first, which has a pore size range of 1 µm to 100 µm, preferably in the range of 1 µm to 20 µm. The coalescing cartridge usually has a pleated design or a string wound design utilizing hydrophilic material, such as cotton. Fine water droplets are absorbed by the filter fibers due to their hydrophilic surface property. As more and more water is absorbed in the filter cartridge, agglomeration occurs and larger water globules (greater than 100×100 mesh typically used) are formed. The jet fuel flowing through this first cartridge then carries these away. Then the jet fuel containing water globules flows into the separation cartridge, which is made from 100×100 mesh PTFE screen. In the prior art, the mesh size must be this large to prevent the buildup of water on the surface, which will occur with smaller mesh sizes. The jet fuel freely passes through the screen, but, due to its hydrophobic surface property, the PTFE screen retains the water globules and prevents their passage. The retained water globules then settle down to the bottom of the water collection chamber.

Surfactant fuel additives are often added to jet fuel for the purpose of cleaning the aircraft fuel system and allowing the engine components to operate more effectively and efficiently at higher temperatures. One particularly useful additive is SPEC-AID 8Q462, as sold by BetzDearborn In., Trevose, Pa., which is known as a +100 additive because it allows engine operation temperature to be increased by up to 100 degrees Fahrenheit. However, the side effect of surfactant fuel additives is that they break down the water droplets to much smaller sizes (1 µm to 10 µm), forming a stable water emulsion in the jet fuel. Each water droplet is surrounded by surfactant, the molecules of which consist of a hydrophilic head functional group (hydrophilic head) and a hydrophobic tail functional group (hydrophobic tail). The hydrophilic heads of the surfactant molecules attach to the water droplet and the hydrophobic tails face outward, where they are solvated by the jet fuel and form a stable emulsion. Very small droplets of water bound by surfactant thus characterize this emulsion. Since the surfactant-coated water droplets are thus hydrophobic at their surface, they will not be absorbed in the hydrophilic coalescing filter cartridge of the prior art. Therefore, there will be no water coalescing effect in the coalescing filters. Consequently, the jet fuel and the fine surfactant-bound water droplets freely pass through the first filter without coagulation, remain dispersed in the flow stream and reach the PTFE screen filter cartridge, where, due to the much larger pore size of the screen, they pass through and continue to contaminate the fuel.

In the instant invention, the filter medium is chosen to be hydrophobic in contrast to the accepted prior art. However, since the water molecules are bound with surfactant, and are now functionally hydrophobic, the water is not repelled by the hydrophobic filter medium, but rather passes into the filter. Because the tail of the surfactant molecule is hydrophobic, it is attracted to the surface of the hydrophobic filter medium. At the surface of the hydrophobic filter, the surfactant-bound water attaches and waits until a larger build-up occurs. As the surfactant-bound water molecules pass into and build up on the surface of the hydrophobic filter, the water agglomerates, breaking the boundary of the surfactant. The coagulated water then passes out of the filter into the stream between the first and second filter.

Similar to the conventional fuel-water separator, the instant invention is also comprised of two filter cartridges: A water coagulation cartridge and a hydrophobic water separation cartridge. But here the similarity ends. The water coagulation cartridge of the instant invention is a hydrophobic depth filter cartridge. The filter medium can be nylon, polyester, polyvinylidene difluoride or polypropylene. As discussed above, the surfactant-coated water droplets have a hydrophobic surface when surfactant additives are present in the oil or fuel. As the oil or fuel and the now "hydrophobic water droplets" flow through the hydrophobic filter cartridge, the "hydrophobic water droplets" attempt to be absorbed by the hydrophobic filter fibers and become contained within the filter. As more water droplets are absorbed in the cartridge, multi-layer water/additive globules are formed and, when they become large enough, are carried away by the oil or fuel flow. A globule of water/additive is comprised of multiple water droplets. Its size is usually 5 to 10 times larger than that of a single emulsified water droplet, which would typically be in the range of 1 μm to 10 μm. This action within the filter greatly reduces the degree of water emulsification in the oil or fuel. However, the globules are still in the range of micron sizes and do not settle down easily. The second function of the water coagulation filter is to separate dirt, bacteria, and other suspended solids from the oil or fuel.

Next the oil or fuel and water/additive globules flow to the water separation filter cartridge, which is formed with a hydrophobic membrane (e.g., PTFE) of 0.1 to 5.0 μm pore size, which is approximately three orders of magnitude smaller than used in prior art technology. Use of a filter with such a small pore size with the technology taught in the prior art will result in rapid blocking of the filter surface by water and shut down of the oil or fuel flow. A bypass-flow or sweeping-flow is maintained on the membrane surface at the feed side. The sweeping-flow is used to sweep the membrane surface with high shear motion and to carry the suspension away from the filter surface, while the fuel component of the liquid (e.g., jet fuel), or the oil, penetrates into the membrane pores under pressure. Examples of suitable filter designs include spiral wound module cartridges, tubular cartridges, and hollow fiber cartridges. The desirable sweeping-flow rate is generated by a pumping force across the membrane surface at 0.05 to 3.00 meters per second and the desirable ratio of sweeping-flow rate to the fresh-feed rate is 5:1 to 1:10 by volume.

When oil or jet fuel has surfactant added to it, three things are needed to successfully separate water from the oil or jet fuel with surfactants, particularly when used with surfactants known as "+100 additive". These are 1) hydrophobic membrane
2) sub micron pore size (e.g., 0.1 to 5.0 μm), and
3) sweeping-flow.

Theoretically, hydrophilic membranes can be used for the separation filter in this type of application. However, water droplets are not always completely coated with the hydrophobic substance (additive). Therefore, uncoated water droplets can freely pass through the pores of a hydrophilic membrane. Using a hydrophobic membrane ensures that the uncoated water droplets cannot go through its pores. Since the surface energy of the coated water droplets is similar to jet fuel, the coated water droplet and jet fuel should have similar wettability on the hydrophobic membrane surface. In this case, separation is only controlled by the given pore size of the hydrophobic membrane. The membrane rejects any suspended particle with greater size than the membrane pores. Studies by the inventor have shown that a 0.1 to 5.0 μm PTFE membrane gives desirable water rejection rate and permeate flow rate. Due to the hydrophobic property of the coated water droplets, they favor remaining on the hydrophobic membrane surface. If a water boundary layer is formed on the membrane surface, a certain amount of water will bleed through the membrane under pressure. To solve this problem, a sweeping-flow of oil or fuel is formed on the membrane surface to sweep away the water droplets. With a 0.1 to 5.0 μm PTFE membrane, it is important to maintain a differential pressure that does not exceed 100 psi between the feed solution and the permeate, in order to prevent bleed through of water at the membrane filter. The inventor has also found that the temperature should not exceed 130 degrees Fahrenheit in order to prevent water from vaporizing, passing through both filters and then condensing in the clean fuel.

After exiting the water separation cartridge, the sweeping-flow stream (or concentrate) carries the concentrated emulsified water droplets and then enters a water-settling chamber. In this chamber, a relatively quiet environment is maintained. Fine water droplets agglomerate and form a heavier phase within the chamber. As more water droplets agglomerate in the heavier phase, water emulsion breakdown occurs, and free water is formed at the bottom of the water-settling chamber.

The water separation filter cartridge (PTFE membrane cartridge) works well by itself without the coagulation filter cartridge, if the water concentration is below 0.5% in the feed. However, the permeate flow rate can significantly drop if the water concentration is higher than 1% because the water forms a layer that blocks the surface of the filter. To make an oil or fuel filter commercially practical, it must pass a test with a 3% water concentration in jet fuel and a permeate flow flux of at least 0.5 gallon/min./sq.-ft. of membrane area. The hydrophobic coagulation filter cartridge is a critical component to ensure adequate permeate flow rate with 3% water concentration in the feed. If no prefilter is present, there is a buildup of water that blocks further oil or fuel from passing through the filter. When there is a hydrophilic pre-filter, filtration is excellent, so long as there is no surfactant present to emulsify the water. However, when surfactant is present, the hydrophilic filter allows passage of the water that is emulsified, which then goes through the second filter, since there has been no coalescence.

U.S. Pat. No. 6,042,722 to Lenz teaches a single separator for removal of water by specific gravity from various fuels, including diesel and jet fuel.

U.S. Pat. Nos. 6,203,698 and 5,916,442 both to Goodrich teach the use of hydrophobic filter media to reject water from passage through the filter.

U.S. Pat. No. 5,993,675 to Hagerthy teaches the use of microfibers, which are impervious to the passage of water, but which allow the fuel to flow through.

U.S. Pat. Nos. RE37,165, 5,766,449 and 5,507,942 all to Davis all teach a single filter, which is hydrophobic so that it rejects water penetration.

Although some of these methods rely on a hydrophobic material to reject water, all of these methods utilize a single filter and none of them utilizes the hydrophobic filter to capture and coalesce surfactant-bound water. They function merely by rejection of normal size water droplets, and would be inadequate for rejection of emulsified water.

U.S. Pat. No. 4,988,445 to Fulk teaches the use of multiple spirally wound filters used in two stages. Fulk teaches a "means for enabling concentrate from said first stage module to pass directly to said second stage modules without passing through a pump; [a] means for forcing said feed stream through said first and second stages; and [a] means for recycling a portion of the concentrate from said second stage to said first stage." U.S. Pat. No. 6,146,535 to Sutherland teaches the use of hollow microfibers for phase separation, by exclusion of the aqueous phase through pore size hydrophobicity. Neither of these patents teaches the use of a hydrophobic first filter for the removal of surfactant-bound water through the use of the functional group properties of the surfactant, as is the case with the present invention.

Among other patents, several are of particular interest in evaluating the present invention. For instance to U.S. Pat. No. 4,814,087 to Taylor teaches a number of devices that are able to remove suspended water from fuels. Among these are coalescing devices and electrostatic precipitators. These coalescing devices become filled with water during operation and must be maintained carefully to prevent water from being pumped with the fuel to the point of use.

U.S. Pat. No. 4,372,847 to Lewis teaches the use of a cartridge for filtration that comprises a coalescing stage and a separating stage. This invention is specifically geared to separation of emulsified liquids. It functions through the formation of coalesced droplets that form due to a different specific gravity at the coalescing stage and remain free for removal at the second hydrophobic separating stage.

U.S. Pat. No. 4,814,087 to Taylor teaches a single stage cross-flow hydrophobic separator comprised of a microporous material. Cross-flow is used to clear the water from the separator.

U.S. Pat. No. 5,149,433 to Lien teaches the use of two spirally wound filters in series, whereby the second filter only functions for the removal of water from fuel if the first one fails. Cross-flow is used for the first filter to sweep away water as it accumulates.

U.S. Pat. No. 4,846,976 to Ford teaches a filtration system for a water-containing emulsion that is comprised of two stages, both comprised of hydrophobic microfilters. A backwash accomplishes cleaning of the first microfilter. While this uses hydrophobic material, this invention serves to remove small quantities of emulsified oil and fat from the water, thus providing clean water for disposal, rather than removal of water from the hydrocarbons.

U.S. Pat. No. 5,443,724 to Williamson et al., teaches the use of two filters, the first being a coalescing unit and the second being a separating unit. Coalescence is accomplished by a choice of physical shape of packing material for a critical wetting surface energy "intermediate the critical wetting surface tension of the discontinuous and continuous phases".

The present invention differs from these examples of prior art in distinct ways. The principal function of the present invention is the removal of emulsified water from hydrocarbons, such as oil or fuel. The present invention utilizes two stages of filtration to accomplish the goal of removal of water from oil or fuel. Much of the prior art utilizes single stages that are less effective at removal and cannot remove emulsified water, as it would pass through their filters. Other two stage filtration systems also suffer from the inability to separate emulsified water from the oil or fuel.

The present invention functions by providing a coalescing surface which is near the surface energy of the hydrophobic tail end of the surfactant molecule, whose head end is attached to a water molecule. Due to the attraction of the matching coalescing surface and the tail end of the surfactant, there is a build-up of bound water molecules to form and agglomerate, which agglomerate is then swept through by the oil or jet fuel. Once in the flow between the first and second stages, the agglomerated water is swept away by the sweeping-flow.

The present invention differs from U.S. Pat. No. 4,846,976 to Ford, in that Ford essentially teaches the opposite. I.e., removal of small quantities of dispersed, surfactant-bound, fats and oils from water by hydrophobic filters. This would imply that to do the opposite, that is, to remove dispersed, surfactant-coated water, one would require hydrophilic filters (as is the case for conventional two-stage filters).

The present invention differs from U.S. Pat. No. 4,372,847 to Lewis, since Lewis utilizes specific gravity for the coalescing function.

The present invention differs from U.S. Pat. No. 4,814,087 to Taylor, in that Taylor uses a single stage hydrophobic filter and removes only dissolved water. Taylor does mention that coalescers may be used for removal of suspended water, but does not describe a method or apparatus for so doing.

The present invention differs from U.S. Pat. No. 5,443,724 to Williamson et al., in that Williamson et al. removes only particles greater than 0.01 inches and requires water droplets to pass by the surface of a second filter under gravitational force, while the present invention utilizes a high rate of flow forced by pumping. The settling velocity of Williamson et al. is shown in TABLE I.

TABLE 1

| Water Droplet Diameter (inches) | Water Droplet Settling Velocity in Fuel (m/s) |
| --- | --- |
| 0.01 | 0.003 |
| 0.015 | 0.006 |
| 0.02 | 0.011 |
| 0.025 | 0.015 |
| 0.03 | 0.019 |
| 0.035 | 0.023 |
| 0.04 | 0.028 |
| 0.045 | 0.033 |
| 0.05 | 0.038 |

For the present invention, wherein the size of the agglomerated particles is less than 0.004 inches, the flow velocity over the selected range of ratios of sweeping-flow to fresh-feed flow ranges between 0.05 and 3.00 meters per second, as seen in TABLE II below.

TABLE II

| Ratio of Sweeping Flow to Fresh Feed Flow | Sweeping Flow Velocity on Membrane Surface (m/s) |
| --- | --- |
| 10% | 0.05 |
| 33% | 0.19 |
| 50% | 0.29 |
| 67% | 0.39 |
| 100% | 0.60 |
| 200% | 1.16 |
| 300% | 1.75 |
| 400% | 2.33 |
| 500% | 3.00 |

Thus, it is readily seen that the sweeping-flow velocity of the present invention, at a minimum of 0.05 meters per second is substantially higher than the gravitational flow of Williamson et al., which reaches a maximum at 0.038 meters per second for a droplet of 0.05 inches in diameter. The droplet size of the present invention is 0.004 inches at a maximum, substantially smaller than the smallest water droplet of Williamson et al, which would have a velocity of only 0.003 meters per second under gravitational force.

Williamson et al. utilizes physical shape of the packing material for coalescence in the fashion of a baffle, and further that Williamson et al. specifies that the coalescer must allow wetting by the fuel, but not by the suspended water (discontinuous liquid phase). In the present invention, the coalescer is specifically hydrophobic to match the hydrophobic tail of the wetting agent, and its surface tension is thus near to or lower than that of the surfactant-bound water. Thus, the surface energy of the coalescing cartridge of the instant invention has no relationship to the surface tension of unbound water, but is specifically wet by the suspended water (discontinuous phase).

According to Williamson et al., the coalescing element must have a surface energy (or critical wetting surface tension) which is greater than the surface tension of the continuous liquid phase. In fact, Williamson et al. specifically requires that the surface energy be intermediate the continuous phase (fuel) and the discontinuous phase (water). Since jet fuel is approximately 23 mN/m and water is 72.5 mN/m, this would lead to practice of the art in Williamson et al. with a coalescer of approximately 48 mN/m, which is clearly much greater than for the hydrophobic materials of the present invention, which are typically around 30 mN/m or less.

In the instant invention, the coalescing element may have a surface energy lower than the surface tension of the continuous phase, and is preferably as close as possible to the surface tension of the continuous phase. The surface tension of the discontinuous phase is wholly irrelevant, since it is bound with surfactant molecules, whose very function is to transform the discontinuous phase into a material having a surface tension that is very close to the continuous phase.

The present invention offers significant features and advantages over the above prior art devices and methods.

Accordingly, a feature and advantage of the present invention is that it provides a method and a device to remove water (up to 5%) in oil or fuel, and to obtain a clean output of oil or fuel with less than 5 ppm of water, while maintain a high flow rate not possible with the prior art.

A further feature and advantage of the present invention is that instead of coalescing water from oil or fuel in between the first stage and the second stage as in a conventional fuel filter design, this invention uses a hydrophobic depth filter and a PTFE membrane filter to separate and concentrate contaminated oil or fuel. The concentrate goes to a settling chamber after the two filtration stages. Free water settles down in the chamber.

A anthoer feature and advantage of the present invention is that the coagulation filter cartridges and water separation filter cartridges may be installed in one filter housing with multiple chamber design.

Still another feature and advantage of the present invention is that the internal circulating pump design eliminates the need for a working tank, which is necessary for common cross-flow filter systems.

Still yet another feature and advantage of the present invention is that this invention solves the problem of inefficiently and ineffectively removing emulsified water from oil or fuel with surfactant additives when using a conventional fuel-water separator.

Still a further feature and advantage of the present invention is its ability to overcome the common problem of the filter becoming dry and requiring change-out, when it is idle after use. This will occur where hydrophilic materials are used for the filter, as they will crack when they dry out. Synthetic fibers do not suffer this problem and are typically hydrophobic.

These and other features and advantages of the present invention will become more apparent to one skilled in the art from the following description and claims when read in light of the accompanying drawings.

BRIEF SUMMARY OF THE INVENTION

The instant invention is a self-contained, multi-chambered two-stage filtration system, wherein there is both a water coagulation stage and a water separation stage. The first stage comprises a dead-end filter with hydrophobic media having a pore size range of 0.5 µm to 100 µm. The second stage comprises a sweeping-flow of retentate across a filter with a membrane that is hydrophobic, and which is typically made of polytetrafluoroethylene (PTFE), with a pore size of approximately 0.1 to 5.0 µm.

Water coalescing takes place in the first stage and thus no coalescing needs to take place between the first and second stages, nor in the second stage.

An internal circulating pump is used to create the sweeping-flow. The ratio of sweeping-flow rate to fresh-feed flow rate is in the range of 5:1 to 1:10.

No working tank is required for the concentrate.

Flow takes place from the outside to the inside of the coagulation cartridge. The flow is parallel to the membrane surface of the separation cartridge.

There is a chamber for settling of water in retentate, and this has baffles to restrict and direct flow, and also to quiet the chamber to facilitate the settling of the water.

The system is capable of treating oil or fuel with additives up to 5% water concentration.

BRIEF DESCRIPTION OF THE DRAWINGS

The present invention will be better understood by reading the Detailed Description of the Preferred and Selected Alternate Embodiments with reference to the accompanying drawing figures, in which like reference numerals denote similar structure and refer to like elements throughout, and in which.

REFERENCE NUMERALS IN DRAWINGS

Figure 1:
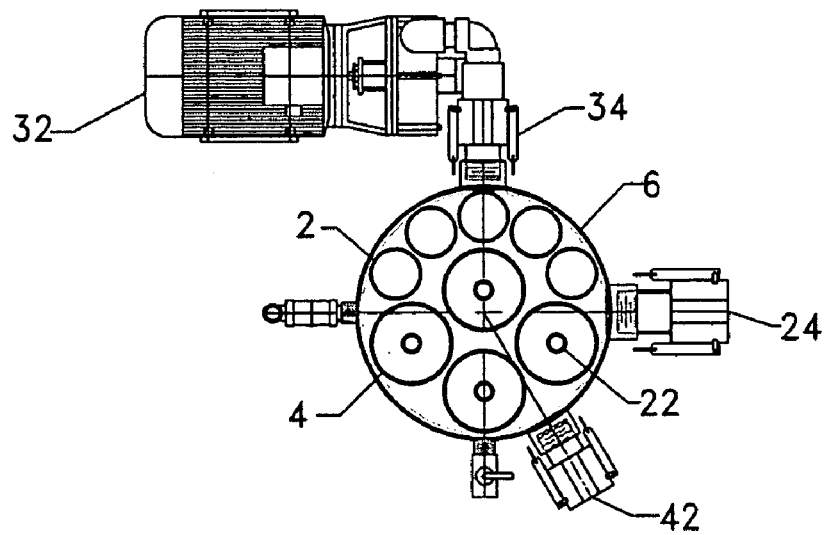
FIG. 1 depicts the spiral-wound enhanced filtration system in top sectional view and in cross sectional view.
Figure 1:
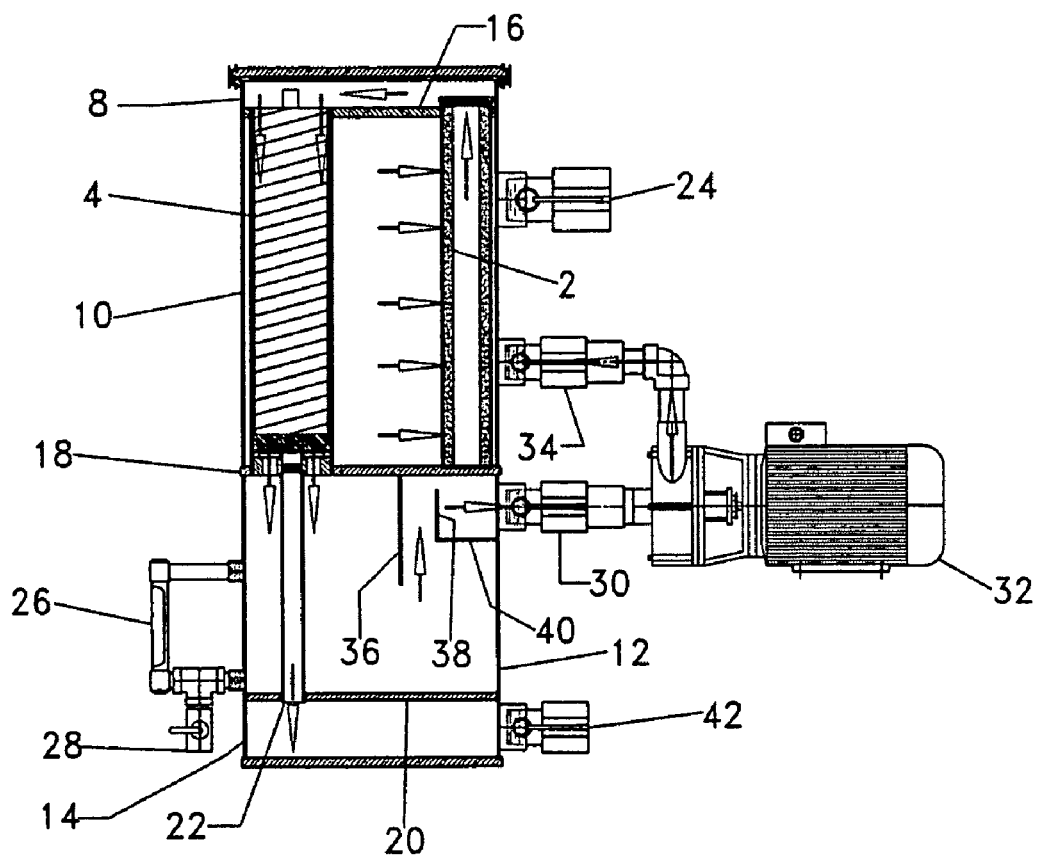

2. Coagulation hydrophobic filter cartridge
4. Water separation hydrophobic membrane cartridge
5. Water separation cartridge housing
6. Filter housing
7. Coagulation cartridge housing
8. Top chamber
10. Feed chamber
12. Retentate chamber for water settling
14. Permeate chamber
16. Feed separation plate
18. Retentate plate
20. Permeate separation plate 22. Tube
24. Fresh feed inlet
26. Sight glass tube
28. Drain valve
30. Concentrate outlet
32. Circulation pump
34. Recirculation feed inlet
36. Outer baffle plate
38. Inner baffle plate
40. Horizontal plate
42. Clean oil or fuel outlet
46. Cartridge exit
48. Ribs or tabs
50. Perforated tube sleeve
52. Non-perforated tube sleeve
54. O-rings or C-rings
55. Gasket
56. Removable cap
57. V shape seal ring
58. Feed
60. Center permeate tube
62. Concentrate flow
64. Small opening
65. Retentate bushing
70. Emulsified water molecule
72. Water molecule
74. Hydrophilic functional group (head)
76. Hydrophobic functional group (tail)
78. Filter surface
80. Water bound to filter surface
82. Coalescing water
84. Water agglomerate breaching surfactant coating
86. Large water globule
90. Retentate downspout
92. Ring support
94. Drain

DETAILED DESCRIPTION OF THE
PREFERRED AND SELECTED ALTERNATIVE
EMBODIMENTS

In describing the preferred and selected alternate embodiments of the present invention, as illustrated in FIGS. 1-5, specific terminology is employed for the sake of clarity. The invention, however, is not intended to be limited to the specific terminology so selected, and it is to be understood that each specific element includes all technical equivalents that operate in a similar manner to accomplish similar functions.

The present invention is particularly suited to removal of emulsified water from oils and fuels, such as, for exemplary purposes only, hydraulic oil, turbine oil, lubrication oil, food grade oil, fuel oil, jet fuel, diesel fuel, and/or gasoline.

Figure 2A:
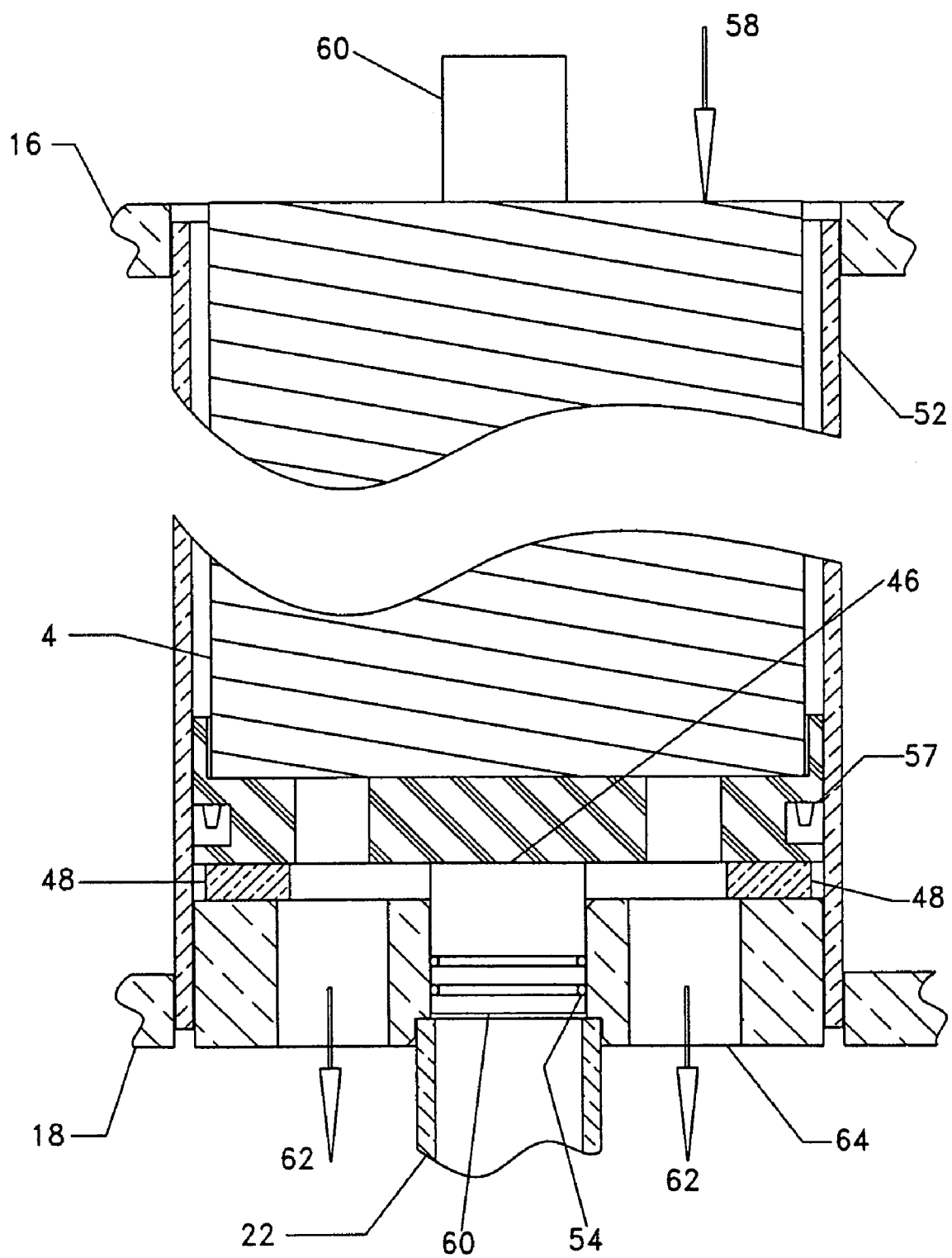
FIG. 2A shows a cross sectional view of the membrane filter and its assembly into its non-perforated tube sleeve.
Figure 2B:
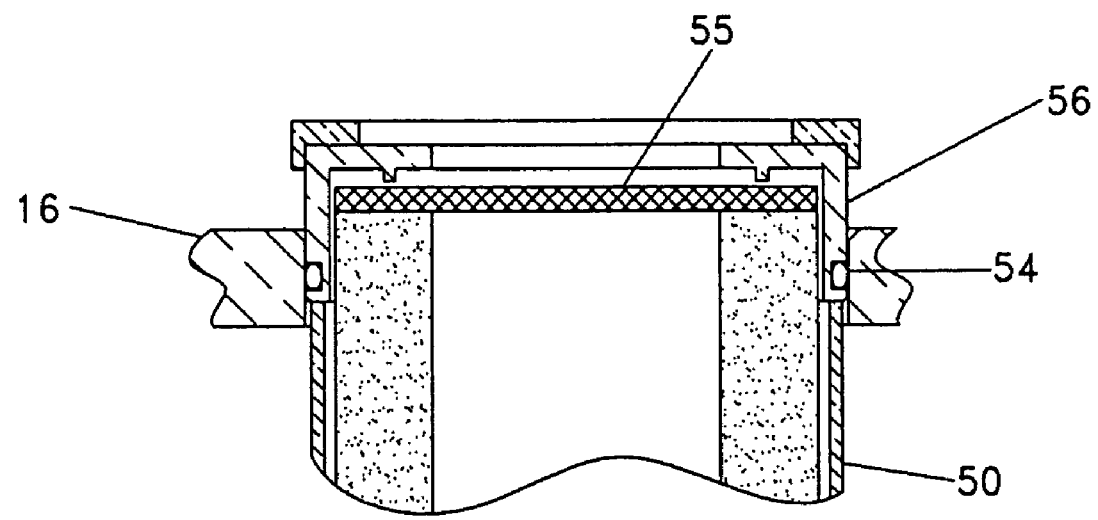
FIG. 2B shows a cross sectional view of the coagulation filter and its assembly into its perforated tube sleeve.
Figure 2B:
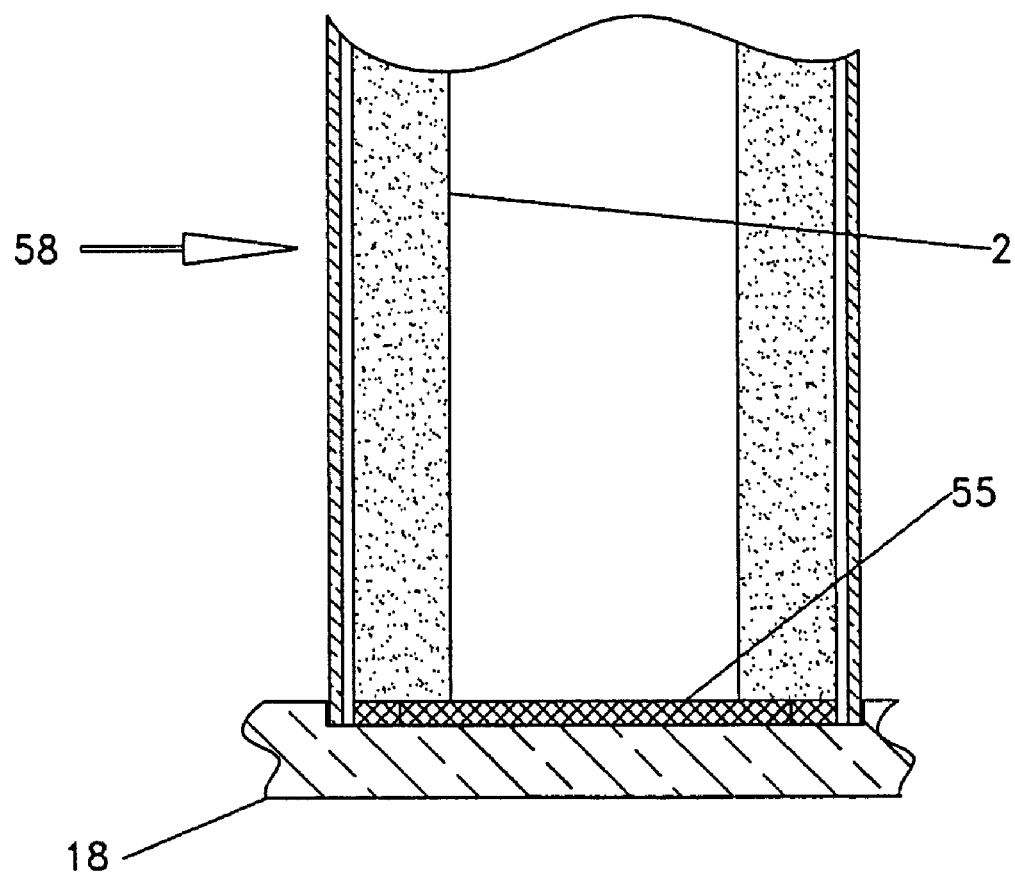

The coagulation filter cartridges 2 and water separation filter cartridges 4 are installed in a filter housing 6, in which four chambers (top 8, feed 10, retentate 12, and permeate 14) are formed using isolation plates, as shown in FIG. 1. Two groups of inner tube sleeves 50,52 (for the coagulation filters and water separation filters) are fixed between the feed separation plate 16 and the retentate plate 18 in the feed chamber 10, as shown in FIGS. 2A and 2B. The number of tube sleeves 50,52 in both of these groups can vary depending on the process rate. The feed separation plate 16 has openings corresponding to the tube sleeves 50,52. The coagulation cartridges 2 and membrane cartridges 4 are installed in their respective tube sleeves 50,52. The function of the tube sleeves 50,52 is to guide filter cartridge 2,4 installation and to direct flow in the housing 6. The tube sleeves of the coagulation cartridges 2 are perforated tubes 50, and the sleeves of membrane cartridges 4 are non-perforated tubes 52.

As seen in FIG. 2B, the coagulation cartridges 2, are attached with o-rings 54 and gaskets 55 at their ends, are inserted into the perforated tube sleeves 50, and sit on the retentate bushing 65. A removable cap 56, attached with an o-ring 54, is placed on the top of each cartridge. A compression force (e.g., using clamps or bolt) is applied on each cap 56 to compress the gaskets 55 at each end of the cartridge. The o-ring 54 on the cap 56 touches the inside wall of the opening on the feed separation plate 16. No fluid bypass is allowed due to the o-ring seals.

The water separation cartridge 4 (or membrane cartridge) shown in FIG. 2A is a spiral-wound design. Feed 58 enters the cartridge at one end. The permeate flow comes out from the center tube 60. The concentrate flow 62 (sweeping-flow, or bypass-flow) comes out at the other end of the cartridge. A V shape seal ring 57 sits in the seal groove of the end cap 56 located at the flow exit end of the cartridge. The V seal ring 57 is used to prevent flow bypass between the inner wall of the tube sleeve and the outer wall of the cartridge. Two o-rings 54 are attached to the outer wall of the permeate center tube 60 at the flow exit end 46 of the cartridge, preventing the bypass of unfiltered fluid to the permeate stream. The membrane cartridge 4 is inserted into the membrane tube sleeve 52 and sits on several ribs or tabs 48, which are welded onto the retentate bushing 65. The purpose of the tabs is to create flow passages for the concentrate flow. Several small openings 64 are placed near the tabs 48 to drain the concentrate to the settling chamber 12 through the retentate bushing 65. The permeate center tube 60 is inserted into an opening on the retentate bushing 65. The two o-rings 54 on the center tube touch the inner wall of the opening. A tube 22 is attached to the opening at the other side of the retentate bushing 65 to direct the permeate flow to the permeate chamber 14.

In FIG. 1, the fresh feed inlet 24 is located at the middle of the feed chamber 10. Jet fuel or oil with water contamination is fed into the feed chamber 10. The feed passes through the perforated tube sleeves 50 and the coagulation cartridges 2, and flows out from the top of each coagulation cartridge 2. The filtrate from the coagulation cartridges 2 turns 180 degrees in the top chamber 8 and flows downward into the membrane cartridges 4 inside the non-perforated tube sleeves 52. The permeate from each membrane cartridge 4 is guided to the permeate chamber 14, and the concentrate drains into the settling chamber 12, in which a relatively quiet environment is maintained so that water droplets can settle down on the permeate separation plate 20. A sight glass tube 26 is mounted on the outside wall of the chamber to monitor the water level. Free water is drained through the drain valve 28.

The outlet for the concentrate 30 (located at the upper portion of the settling chamber) is attached to the suction port of the internal circulation pump 32. The discharge of the pump is connected to the recirculation feed inlet 34 through an appropriate one-way check valve (not shown). This pump 32 is used to generate extra flow as sweeping-flow or bypass-flow inside the membrane cartridges 4. The suction and discharge of the pump are attached to the filter housing 6 using quick disconnects so that the filter housing 6 and the pump 32 can be easily assembled and disassembled. In order to enhance the water settling efficiency, two parallel angled baffle plates 36,38 are vertically placed near the concentrate outlet 30 inside the settling chamber 12. The left and right sides of each baffle plate are welded on the inner wall of the filter housing. The upper end of the inner baffle plate 36 is attached to the retentate plate 18, and the lower end of the outer baffle plate 38 is welded on a horizontal plate 40, which is also welded to the inner wall of the filter housing 6. Concentrate from the membrane cartridges first flows downward into the settling chamber 12. Heavier water droplets stay at the lower portion of the settling chamber 12. The light liquid phase at the middle of the chamber turns 180 degrees and enters into the passage created by the two parallel angled baffle plates 36,38. At the end of the passage, the flow turns at least 90 degrees and exits from the concentrate outlet 30. The fluid from the concentrate outlet 30 is sent back to the feed chamber 10 using the internal circulation pump 32. Fresh feed is constantly fed into the feed chamber through the fresh feed port 24. The feed rate of the fresh feed is the same as the production rate (permeate rate).

The fuel filter of the instant invention has one fresh feed inlet 24, located at the middle of the filter housing 6, and one clean oil or fuel outlet 42, located at the bottom of the housing 6. The fresh feed inlet 24 is connected to a oil or fuel storage tank (not shown), and the clean oil or fuel outlet 42 is connected to the oil or fuel supply tank of an oil or fuel filling station (not shown) or to an engine. The internal circulating pump 32 continuously runs during the filtration operation. This pump can be a centrifugal pump, or a gear pump, driven by an electric motor. Free water is drained through the drain valve 28. A sight glass tube 26 is mounted on the outside wall of the chamber to monitor the free water level. A pressure differential gauge (not shown) is used to monitor the pressure between the feed and the clean oil or fuel.

Figure 3:
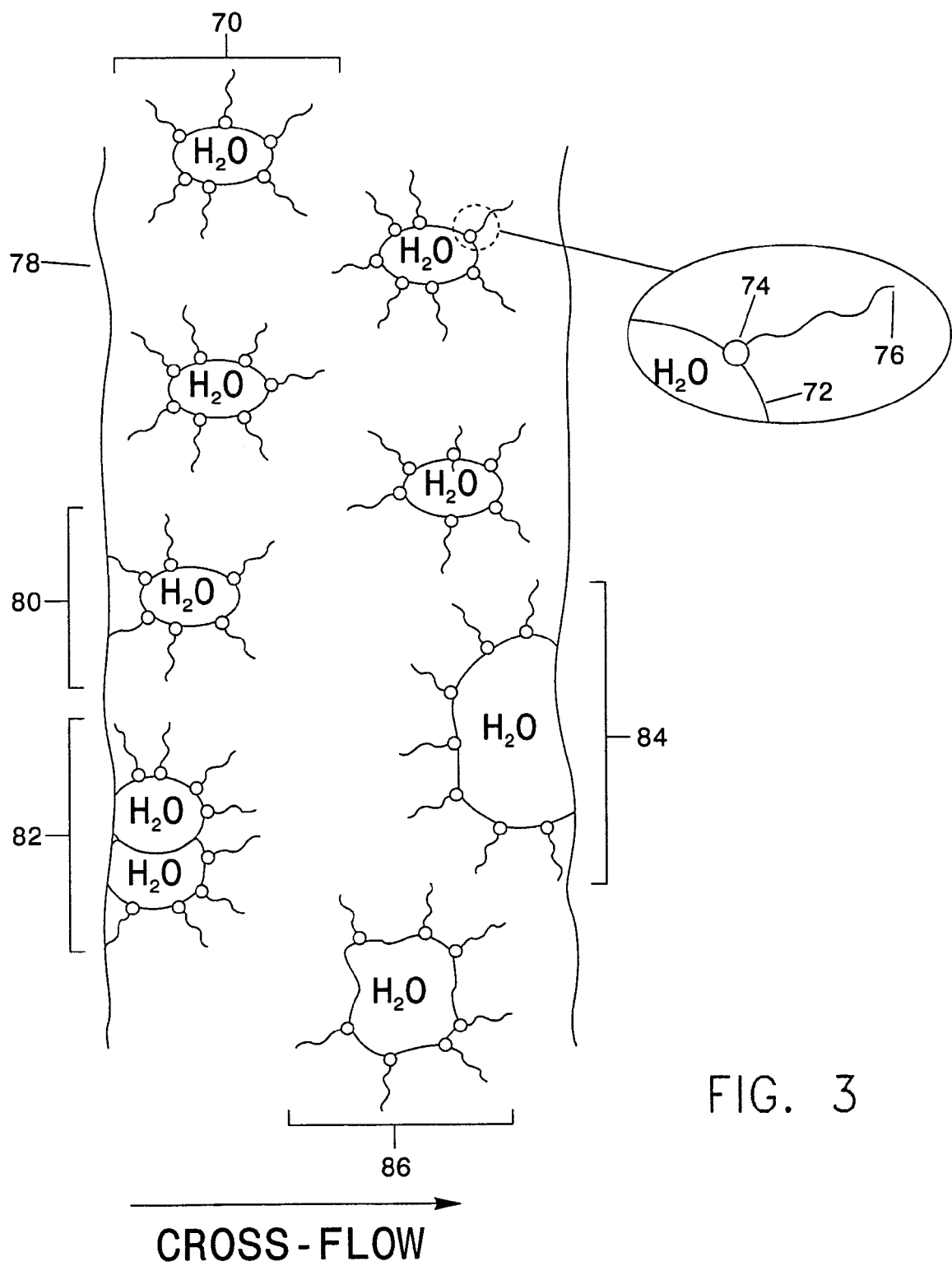
FIG. 3 illustrates the operation of the surfactant-bound water being attracted to the hydrophobic filter surface, forming globules and flowing out into the space between the first and second filters.

In a hydrocarbon, such as jet fuel, which contains a surfactant, there will be present an emulsion of water in the fuel. This emulsified water is small enough to pass through both filters and will continue to contaminate the fuel unless it is removed. FIG. 3 depicts emulsified water molecules 70 dispersed throughout the fuel. In order to form the emulsion, each water molecule 72 has attached to it several molecules of surfactant. Each surfactant molecule has a hydrophilic functional group (head) 74 that attaches to the water molecule 72 and a hydrophobic functional group (tail) 76 that extends away from the water molecule 72 and which is solvated by the hydrocarbon jet fuel. As these emulsified water molecules 70 pass into the filter, they are attracted to the filter surface 78, binding to it as shown at 80. The hydrophobic tail 76 attaches to the filter surface and holds the water molecule 72 in place. As more emulsified water molecules gather, they group together and coalesce as shown at 82. Eventually, the surfactant coating is breached and the water molecules join together still attached to the surface of the filter as shown at 84. In time, the water globule becomes too large for the forces holding the hydrophobic tail to the surface of the filter, and they break away as shown at 86. As it passes out of the filter, the water is caught by the sweeping-flow of the jet fuel in the region between the first and second filter. Many of these agglomerations are carried away by the sweeping-flow of the fuel. Some however, are carried to the second filter, where because of their large size, they are unable to pass. The sweeping-flow then carries them away to the retentate settling chamber.

Because of the operation of the instant invention, it is possible to provide cleaned hydrocarbon fuel containing less than 5 ppm of water, even in the presence of surfactants. The initial water concentration can be as high as 5%.

In the case where there is no surfactant present in the jet fuel, the water will pass through the first filter and be rejected by the second filter in the normal fashion for a single stage filter.

Description—Additional Embodiment

Figure 4:
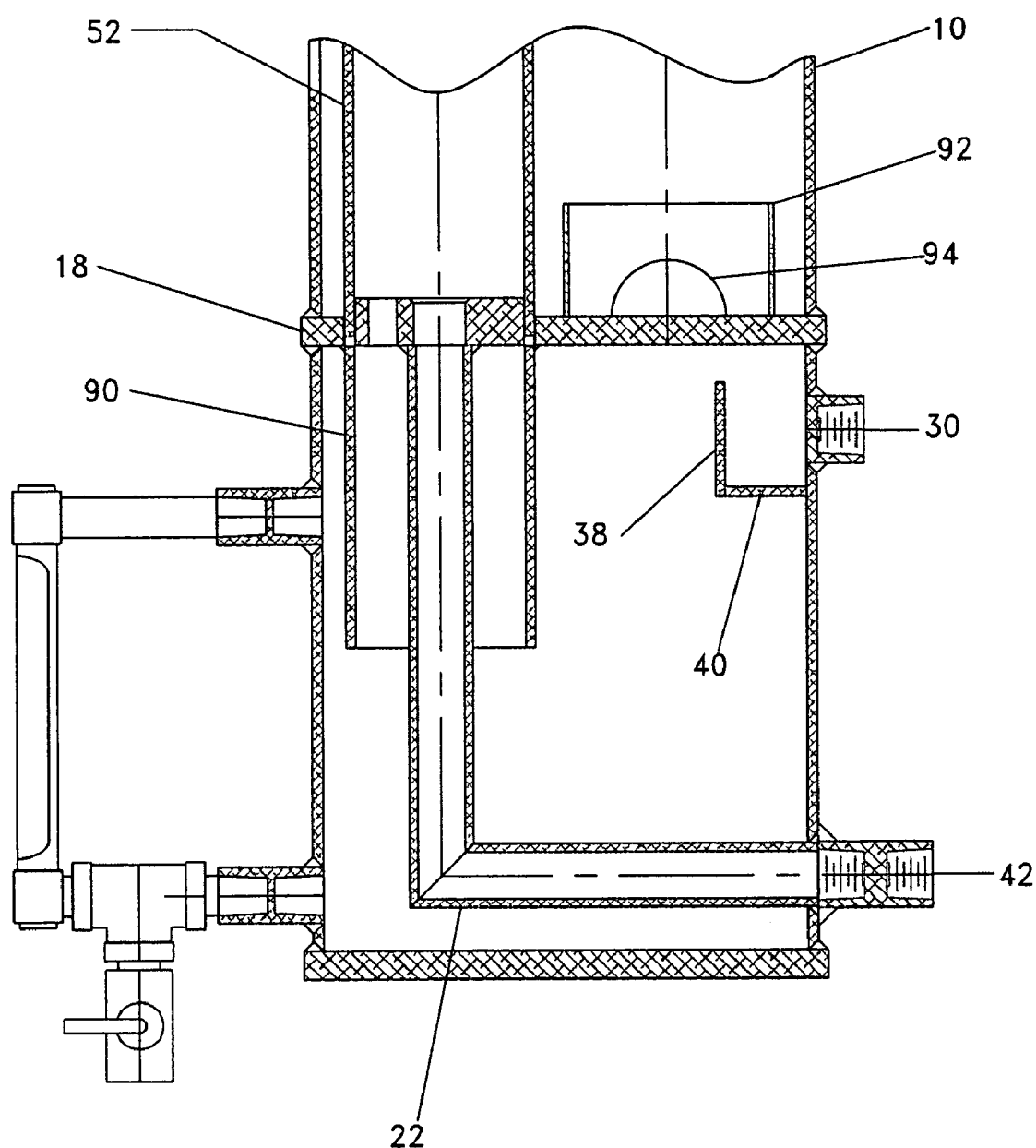
FIG. 4 is a cross sectional view of an alternative embodiment of the invention, in which the perforated tube is no longer required for the coagulation filter.

FIG. 4 illustrates an alternative embodiment of the invention, in which the perforated tube sleeve 50 shown in FIG. 2B is no longer required for the coagulation filter 2 (filter shown in FIG. 1 only; removed from FIG. 4 for clarity). In the embodiment shown in FIG. 4, the coagulation filter 2 (filter shown in FIG. 1 only; removed from FIG. 4 for clarity) is seated inside a ring support 92, which serves as a guide. In order to allow drainage of fluid when the coagulation filter 2 (filter shown in FIG. 1 only; removed from FIG. 4 for clarity) is removed, a drain 94 is provided. An additional change has been added to this embodiment, wherein the inner baffle plate 36 from FIG. 1, has been replaced by a downspout 90. Other than the addition of a downspout 90, the second non-perforated tube sleeve 52 of the water separation hydrophobic membrane cartridge 4 (filter shown in FIG. 1 only; removed from FIG. 4 for clarity) remains unchanged.

Operation—Additional Embodiment

This alternative embodiment functions similarly to the preferred embodiment of FIG. 1, wherein feed solution flows into the first filter, which is the coagulation cartridge 2 (filter shown in FIG. 1 only; removed from FIG. 4 for clarity) and then passes to the second filter, which is the water separation hydrophobic membrane cartridge 4 (filter shown in FIG. 1 only; removed from FIG. 4 for clarity). However, instead of flowing into the coagulation filter 2 (filter shown in FIG. 1 only; removed from FIG. 4 for clarity) through a perforated tube sleeve 50, both as shown in FIG. 1, the feed fluid surrounds the coagulation cartridge 2 (filter shown in FIG. 1 only; removed from FIG. 4 for clarity) directly, and passes into it. Flow out of this first filter is the same as in the preferred embodiment of FIG. 1. Additionally in this alternative embodiment, shown in FIG. 4, fluid departing the second filter now passes out through a downspout 90, which functions in the same fashion as the inner baffle plate 36 depicted in FIG. 1, aiding in the settling down of water.

Description—Additional Embodiment

Figure 5:
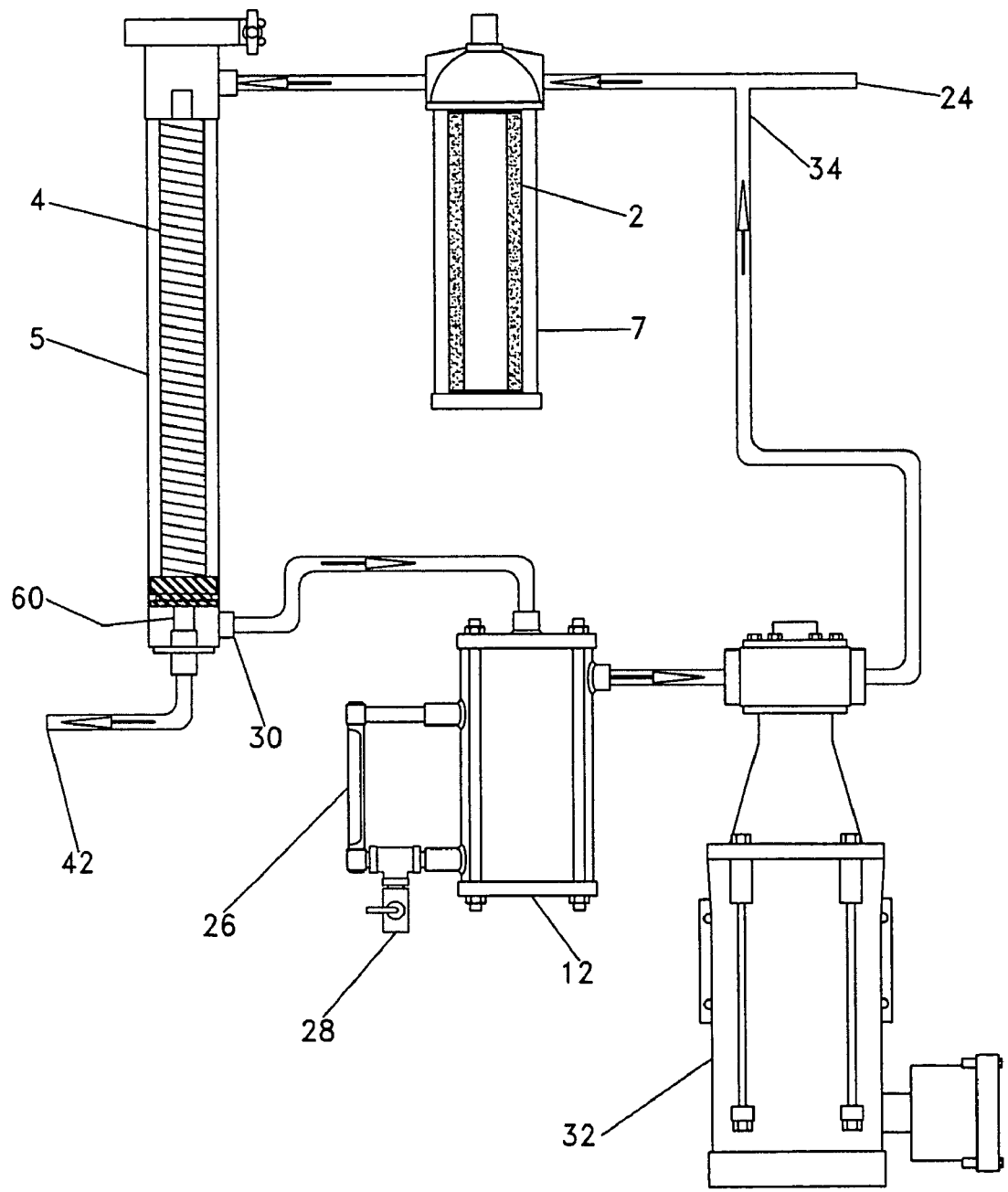
FIG. 5 shows by diagram another embodiment of the invention, in which the two filters are no longer in a common housing, but are now connected in series in individual housings.

An additional embodiment is shown in FIG. 5. In this embodiment, the filter cartridges have been arranged in series in separate housings 5,7. Coagulation filter 2 is enclosed in housing 7, with a fresh feed inlet 24 attached thereto. The water separation hydrophobic membrane cartridge is in housing 5. Connected thereto are the inlet from the first filter, a concentrate outlet 30, a circulation pump 32 and a recirculation feed inlet 34, with an appropriate one-way check valve (not shown). Prior to passing into the circulation pump 32, the concentrate passes into a retentate chamber for water settling 12, to which is attached a sight glass 26 and a drain valve 28. Additionally, there is a center permeate tube 60 followed by a clean fuel outlet 42 within this cartridge.

Operation—Additional Embodiment

In FIG. 5, coagulation cartridge 2 is enclosed in housing 7 and accepts the feed solution through the fresh feed inlet 24. Solution passes into the cartridge and flows out to the water separation hydrophobic membrane cartridge 4. Sweeping-flow is maintained within the housing 5, which contains the water separation hydrophobic membrane cartridge, and concentrate passes out through the concentrate outlet 30, to a retentate chamber for water settling 12, then through the circulation pump 32 where it returns to the coagulation cartridge 2 through the recirculation feed inlet 34. The permeate passes into the center permeate tube 60, where it departs the filtration system through the clean fuel outlet 42, which connects to an engine (not shown) or external fuel storage tank (not shown). Settled water level can be seen in the sight glass 26 and removed from the retentate chamber for water settling 12 by opening the drain valve 28.

Description—Alternate Embodiment

It is envisioned in an alternate embodiment that the present invention could be utilized for cleaning oils by removal of water therefrom. Such oils could include, for exemplary purposes only, hydraulic oil, turbine oil, lubrication oil, food grade oil and fuel oil.

Operation—Alternate Embodiment

In this alternate embodiment, oils contaminated by water and containing surfactacts that preclude their ready separation could be readily cleaned through the utilization of the present invention.

The present invention utilizes a novel concept of employing a hydrophobic first filter to capture and agglomerate water molecules that are bound into an emulsion through the action of the functional group properties of a surfactant. Prior art has used hydrophilic first filters to capture free water, but these will not function to agglomerate water when the water is emulsified into very small particles that are coated with surfactant.

The foregoing description and drawings comprise illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings presented in the foregoing descriptions and the associated drawings. Although specific terms may be employed herein, they are used in a generic and descriptive sense only and not for purposes of limitation. Accordingly, the present invention is not limited to the specific embodiments illustrated herein, but is limited only by the following claims.

We claim:

1. An apparatus for filtration of water from hydrocarbons comprised of:
    a fresh-feed inlet;
    water emulsified by a surfactant having a hydrophobic tail portion;
    a first dead end filter, having a filter medium that is hydrophobic, and wherein said filter medium comprises a surface that attracts said hydrophobic tail portion of said surfactant;
    a system for the recirculation of a retentate;
    a permeate chamber;
    a chamber for water settling;
    a top chamber;
    a second cross-flow filter, having a membrane that is hydrophobic, said membrane having a sweeping flow of the retentate thereacross, said second cross-flow filter communicating on its inlet end with said top chamber and on its outlet end with said chamber for water settling, wherein said second cross-flow filter further comprises a center tube for collection of a permeate in communication with said permeate chamber;
    a non-perforated tube sleeve guide containing said second cross-flow filter;
    a common housing to contain both said first and second filters; and
    an outlet for clean hydrocarbon permeate.

2. The filtration apparatus as set forth in claim 1, further characterized by a ratio of sweeping-flow to fresh-feed flow in the range of 5:1 to 1:10.

3. The filtration apparatus as set forth in claim 1, wherein the velocity of said sweeping-flow is at least 0.05 meters per second.

4. The filtration apparatus as set forth in claim 1, wherein said sweeping-flow comprises pumped flow.

5. The filtration apparatus as set forth in claim 1, wherein the pressure differential between feed pressure and permeate pressure is less than or equal to 100 psi.

6. The filtration apparatus as set forth in claim 1, wherein operating temperature is maintained below or equal to 130 degrees Fahrenheit.

7. The filtration apparatus as set forth in claim 1, wherein said first dead end filter is made from a material selected from the group consisting of nylon, polyester, polyvinylidene difluoride and polypropylene.

8. The filtration apparatus as set forth in claim 1, wherein said first dead end filter has a pore size in the range of 0.5 μm to 100 μm.

9. The filtration apparatus as set forth in claim 1, in which said second cross-flow filter is of a type selected from the group consisting of spiral wound module cartridges, tubular cartridges and hollow fiber cartridges.

10. The filtration apparatus as set forth in claim 1, in which said second hydrophobic cross-flow filter is made from polytetrafluoroethylene membrane.

11. The filtration apparatus as set forth in claim 10, further characterized by said polytetrafluoroethylene membrane having a sub micron pore size.

12. The filtration apparatus as set forth in claim 10, wherein said polytetrafluoroethylene membrane is of 0.1 to 5.0 μm pore size.

13. An apparatus for filtration of water from hydrocarbons comprised of:
    a fresh-feed inlet;
    water emulsified by a surfactant having a hydrophobic tail portion;
    a plurality of first dead end filters, having hydrophobic filter media comprising a surface that attracts said hydrophobic tail portion of said surfactant,
    a plurality of second filters, having hydrophobic membranes, said membranes having a sweeping flow of retentate thereacross, wherein the velocity of said sweeping-flow is at least 0.05 meters per second;
    a permeate chamber;
    a chamber for water settling;
    a top chamber, wherein said plurality of second filters communicate on their inlet ends with said top chamber and on their outlet end with said chamber for water settling, and wherein said plurality of second filters are each disposed within a non-perforated tube sleeve guide, wherein said plurality of second filters each further comprises a center tube for collection of permeate in communication with said permeate chamber;

a common housing to contain said first and second filters;

a system for the recirculation of retentate; and an outlet for clean hydrocarbon permeate.

14. An apparatus for filtration of water from hydrocarbons comprised of:

a fresh feed inlet;

water emulsified by a surfactant having a hydrophobic tail portion;

at least one first dead end filter, having a filter medium that is hydrophobic, wherein said filter medium comprises a surface that attracts said hydrophobic tail portion of said surfactant, in series with at least one second cross-flow filter, having a membrane that is hydrophobic, said membrane having a sweeping flow thereacross, wherein the velocity of said sweeping-flow is at least 0.05 meters per second, and wherein each said at least one second cross-flow filter is disposed within a separate housing comprising a non-perforated sleeve guide;

a permeate chamber;

a chamber for water settling;

a top chamber, and wherein said at least one second cross-flow filter communicates on its inlet end with said top chamber and on its outlet end with said chamber for water settling, and wherein said at least one second cross-flow filter further comprises a center tube for collection of permeate in communication with said permeate chamber;

a system for the recirculation of retentate; and an outlet for clean hydrocarbon permeate.

15. A method for removal of water from hydrocarbon liquid fuels, oils and solvents containing surfactants, comprising the steps of:

passing a water emulsion containing said hydrocarbon and said surfactant through a first hydrophobic filter comprising a surface;

coalescing water in said first hydrophobic filter to form large globules, wherein said surfactant comprises a hydrophobic tail portion, and wherein said hydrophobic tail portion is attracted to said surface;

carrying away agglomerated water globules in the flow stream between said first hydrophobic filter and a second hydrophobic filter;

excluding water globules at the surface of said second hydrophobic filter having a sweeping flow thereacross, wherein the velocity of said sweeping-flow is at least 0.05 meters per second; and passing water-free hydrocarbon liquid through said second hydrophobic filter, wherein said second hydrophobic filter communicates on its inlet end with a top chamber and on its outlet end with a chamber for water settling, and wherein said second hydrophobic filter is disposed within a non-perforated tube sleeve guide, and wherein said second hydrophobic filter further comprises a center tube for collection of permeate in communication with a permeate chamber.

16. The method of filtration as set forth in claim 15, wherein said hydrocarbon is selected from the group consisting of hydraulic oil, turbine oil, lubrication oil, food grade oil, fuel oil, jet fuel, diesel fuel, gasoline, and combinations thereof.

17. The method of filtration as set forth in claim 15, wherein the pressure differential between feed pressure and permeate pressure is less than or equal to 100 psi.

18. The method of filtration as set forth in claim 15, wherein operating temperature is maintained below or equal to 130 degrees Fahrenheit.

19. A filter apparatus for the coalescing of water emulsified by a surfactant, comprised of a filter with a hydrophobic filter medium having a surface energy near to or less than that of a hydrophobic functional group of said surfactant, wherein said hydrophobic functional group attaches to said hydrophobic filter medium, and wherein said filter has a sweeping flow thereacross, and wherein the velocity of said sweeping-flow is at least 0.05 meters per second, said filter apparatus further comprising a permeate chamber, a chamber for water settling, a top chamber, a second cross-flow filter having a membrane that is hydrophobic, said membrane having a sweeping flow of retentate thereacross, said second cross-flow filter communicating on its inlet end with said top chamber and on its outlet end with said chamber for water settling, and a non-perforated tube sleeve guide containing said second cross-flow filter, wherein said second cross-flow filter further comprises a center tube for collection of permeate in communication with said permeate chamber.

20. The filter apparatus of claim 19, wherein said hydrophobic filter medium is adapted to agglomerate particles of a size less than 0.004 inches.

* * * * *